United States Patent [19]

Reuscher

[11] Patent Number: 5,831,081
[45] Date of Patent: Nov. 3, 1998

[54] PROCESS FOR THE PURIFICATION OF WATER-SOLUBLE CYCLODEXTRIN DERIVATIVES

[75] Inventor: Helmut Reuscher, Emmerting, Germany

[73] Assignee: Consortium für elektrochemische Industrie GmbH, Munich, Germany

[21] Appl. No.: 454,940

[22] Filed: May 31, 1995

[30] Foreign Application Priority Data

Feb. 16, 1995 [DE] Germany .................. 195 05 263.3

[51] Int. Cl.⁶ ............................ C08B 37/16; C07H 1/06
[52] U.S. Cl. ................... 536/127; 536/103; 536/123.1; 536/124; 514/58
[58] Field of Search ................. 514/58; 536/123.1, 536/124, 127, 103

[56] References Cited

U.S. PATENT DOCUMENTS

| | | | |
|---|---|---|---|
| 3,453,257 | 7/1969 | Parmerter et al. | 536/46 |
| 4,870,060 | 9/1989 | Müller | 514/58 |
| 5,041,227 | 8/1991 | van Eikeren et al. | 210/640 |
| 5,134,127 | 7/1992 | Stella et al. | 514/58 |
| 5,376,537 | 12/1994 | Cami et al. | 435/101 |

FOREIGN PATENT DOCUMENTS

| | | |
|---|---|---|
| 2357731 | 5/1975 | Germany . |
| 2700011 | 7/1978 | Germany . |
| 0202889 | 5/1988 | Hungary . |
| 57-202298 | 12/1982 | Japan . |
| 62-104590 | 5/1987 | Japan . |
| 63-229109 | 9/1988 | Japan . |
| 9012035 | 10/1990 | WIPO . |

OTHER PUBLICATIONS

Hashimoto et al., *Denpun Kagaku*, vol. 32(4):307–311, (1985).
Derwent Abstract AN 78–49978A for DE–A 2700011 Omoto, Jul. 6, 1978.
Database WPI, Week 9214, Derwent Publications Ltd. AN 111446 & JP–A–04057801 (Nippon Shokuhin KK) Feb. 25, 1992.
Database WPI, Week 8725, Derwent Publications Ltd., AN 173706 & JP–A–62104590 May 15, 1987 (Ensuiko Seito KR).
Derwent Abstract AN 75–36150W [22] for DE–4–2357731, Merck May 22, 1975.
CA 117:10196s; Sumiyoshi et al JP 045780 Feb. 25, 1992.
CA 98(20):162747z; Szejtli et al. HU22967, 28 Jul. 1992.
CA 119:70467g; Lee et al. *Sanop Misaengmul Hakhoechi* 1992, 20(4),422–9.
CA 113:189816; Okada et al. JP02211890A2; Feb. 10, 1989.
CA 105:81066; Hashimoto et al. *Denpun Kagaku* 1986, 33(1), 10–14.
CA 120:137902; Kokugan et al. *Kagaku Kogaku Ronbunshu* 1994, 20(1), 124–7.
CA 118:127572; Kunime et al. JP04284828A2; Oct. 9, 1992.

*Primary Examiner*—Kathleen K. Fonda
*Attorney, Agent, or Firm*—Collard & Roe, P.C.

[57] ABSTRACT

A process for the purification of water-soluble cyclodextrin derivatives utilizes a reverse osmosis (RO) using at least one hydrophilic, asymmetric solution-diffusion membrane with a nominal molecular weight cut-off of 200–800 D.

14 Claims, 1 Drawing Sheet

PROCESS FOR THE PURIFICATION OF WATER-SOLUBLE CYCLODEXTRIN DERIVATIVES

BACKGROUND OF THE INVENTION

1. Field of the Invention

The invention relates to processes for the purification of water-soluble cyclodextrin derivatives.

2. Prior Art

To date, processes which are employed for the purification of water-soluble cyclodextrin derivatives are recrystallization, ion-exchange chromatography, precipitation methods, extraction processes, dialysis and ultrafiltration. These processes are described, for example, in the following references:

In HU 202889, β-cyclodextrin (β-CD) is reacted with propylene oxide in aqueous sodium hydroxide solution to give hydroxypropyl-β-cyclodextrin. The resulting sodium chloride and the propylene glycol are removed by ion exchange and precipitation of the hydroxypropylated β-cyclodextrin in large amounts of acetone, filtration, taking up the filter cake in water, distillation and, finally, spray-drying. The yield is around 90%, and the salt and propylene glycol content is 0.1%.

CA 117:10196s describes the purification of the same product by fractional chromatography of the aqueous cyclodextrin solution over a cation exchanger. This process affords a yield of 16% of a product with a propylene glycol content of 0.05%.

In U.S. Pat. No. 4,870,060, the sodium chloride obtained as a by-product after the methylation/hydroxypropylation of γ-cyclodextrin in aqueous sodium hydroxide solution is removed by means of ion-exchange chromatography.

CA 98 (20):162747z describes the removal of inorganic salts of methylated cyclodextrins by extracting the methyl-cyclodextrins with organic solvents, such as methylene chloride, chloroform or ethyl acetate.

CA 119:70467 describes the removal of PEG (polyethylene glycol) 6000 from a reaction mixture of maltosyl-β-cyclodextrin by ultrafiltration (UF).

In U.S. Pat. No. 3,453,257, glycidyltrimethylammonium-β-cyclodextrin is washed using methanol and precipitated in acetone.

In U.S. Pat. No. 5,134,127, a sulfobutyl ether of β-CD is purified by means of ion exchange and dialysis. Concentration is effected by ultrafiltration.

In WO 90/12035, (S)-hydroxypropyl-β-CD is purified by dialysis.

CA 113: 189816 describes the continuous removal of branched CD from a reaction mixture by means of a UF membrane.

CA 105: 81066 describes the fractionation of cyclodextrins or other dextrins by ultrafiltration.

CA 120:137902 describes the selective permeability of CD complexes through a UF membrane.

CA 118: 127572 describes the removal of CD complexes by means of a UF membrane.

SUMMARY OF THE INVENTION

The present invention provides an inexpensive, universally applicable process for the purification of water-soluble cyclodextrin derivatives by means of reverse osmosis (RO) using at least one hydrophilic, asymmetric solution-diffusion membrane with a nominal molecular weight cut-off of 200–800 D.

Particularly suitable membranes are those having a nominal molecular weight cut-off of 250–700 D, particularly preferably 350–500 D. Such membranes are available, for example from Millipore GmbH, Eschborn, Germany, and Berghof Laborprodukte GmbH, Eningen u. A., Germany.

Depending on the membrane type, the reverse osmosis can be carried out in water or in aqueous solvents, for example, in mixtures of water in particular with mono- and/or oligo-alcohols (for example, methanol, ethanol, isopropanol, butanol, glycerol, ethylene glycol).

Surprisingly, it has been found that in the purification of cyclodextrin derivatives by means of the process according to the invention, cyclodextrin derivatives are retained by the membrane while inorganic salts, organic solvent residues or smaller organic molecules of up to approximately 350 D can freely pass through the membrane. In contrast to ultrafiltration, this allows cyclodextrin derivatives to be purified by the process according to the invention in a single step, while the product loss is negligible.

In particular, the process according to the invention is therefore also suitable for the removal of inorganic salts, smaller organic molecules or organic solvent residues from cyclodextrin derivatives.

The process according to the invention is not complicated and allows an improved product quality and higher product yields to be achieved with low operating costs. The process according to the invention is therefore very economical.

The advantage of the process according to the invention in comparison with the prior-art purification processes can be demonstrated by way of example in the purification of hydroxypropyl-β-cyclodextrin: in HU 202889, this derivative is purified by a very complicated precipitation in acetone, while in CA 117:10196s the purification is effected by means of ion-exchange chromatography with very poor yields.

In contrast, the process according to the invention allows this derivative to be separated in one step from the sodium chloride which is present and the uncharged propylene glycol to be removed until the impurity is far below 0.1% (g/g) (see Example 11).

The low product loss in the process according to the invention dispenses with the necessity of a multi-step module arrangement. This is an advantage compared with a purification of cyclodextrin derivatives by means of ultrafiltration methods, since ultrafiltration methods require a complicated and expensive multi-step module arrangement (cascade arrangement) if product losses are high.

The reverse-osmosis process according to the invention allows complete purification to be achieved in a single step, using a suitable membrane (see, for example, Examples 8, 9 and 11). This makes the process considerably more economical than all known processes. The product losses in the purification method according to the invention are less than 0.3% per Vo in the case of certain membranes (see Examples 1, 4, 5 and 11).

Any desired reverse-osmosis systems can be employed for the purification process according to the invention.

It is advantageous to employ commercially available reverse-osmosis systems, particularly preferably systems with spirally wound membrane modules.

Examples of such systems are the Remolino system (stirred cell) by Millipore, the PRO-Lab system by Millipore, or the Millipore tangential-flow filtration system MSP006256 for a maximum of 2 spirally wound reverse-osmosis modules.

The parameters for carrying out the process according to the invention are essentially a function of the system or the membrane.

The cyclodextrin derivative to be purified is preferably employed in the form of a 5–60% by weight aqueous solution, particularly preferably in the form of a 20–40% aqueous solution (percent by weight based on the pure CD derivative).

Depending on the membrane type, the process can be carried out in water or else in aqueous solvents, for example in mixtures of water, in particular mixtures with mono- and/or oligoalcohols (for example methanol, ethanol, isopropanol, butanol, glycerol, ethylene glycol).

Depending on the membrane employed, the process is carried out at a transmembrane pressure of 15–70 bar, preferably 30–40 bar and a temperature of 20°–80° C., preferably 20°–50° C. Equally, the pH which is optimal in each case will depend on the membrane employed in each case. It is between pH 2 and pH 11, preferably in a pH range of 6 to 8.

The process according to the invention is suitable for the purification of monomeric cyclodextrin derivatives to obtain industrial-grade up to pharmaceutical quality. Inorganic salts such as, for example, NaCl, KCl, $Na_2CO_3$, organic molecules such as, for example, glycolic acid, glycols, in particular mono- and dipropylene glycols, acetic acid, sodium acetate, 1,2-di-hydroxypropyl-3-trimethylammonium chloride, 2-chloro-4,6-dihydroxy-1,3,5-triazine (monosodium salt), and solvent residues such as, for example, DMF, DMSO, dioxane, THF, methyl ethyl ketone, acetone, methanol, ethanol, isopropanol, butanol, glycerol and ethylene glycol are removed.

The retentate volume which decreases during the process can be kept constant or remain variable, as desired in each case, by adding the aqueous solvent. The solvent may be added continuously or batchwise.

The process according to the invention thus allows on the one hand the removal of both charged molecules (salts) and uncharged molecules, for example by-products of the preparation of the CD derivative, or solvent residues, and, on the other hand, mild concentration of aqueous CD derivative solution.

A known process for the concentration of cyclodextrin derivative solutions is distillation, but this process is not mild.

Moreover, the process according to the invention makes spray-drying of cyclodextrin derivatives more inexpensive since it is more economical to spray-dry a concentrated aqueous solution.

When the concentration is carried out by means of the process according to the invention, only a reduced amount of solvent, or no solvent, generally water, is added to the retentate during the reverse osmosis step. Since the filtrate (permeate) runs off, the retentate (the CD solution) is automatically concentrated. The remaining process parameters are the same as in the purification processes described.

Other objects and features of the present invention will become apparent from the following detailed description considered in connection with the accompanying drawing and examples which discloses several embodiments of the present invention. It should be understood, however, that the drawing and examples are designed for the purpose of illustration only and not as a definition of the limits of the invention.

All percentages in the examples are by weight. The impurities are always based on the dry weight.

DETAILED DESCRIPTION OF PREFERRED EMBODIMENTS

Figure 1:
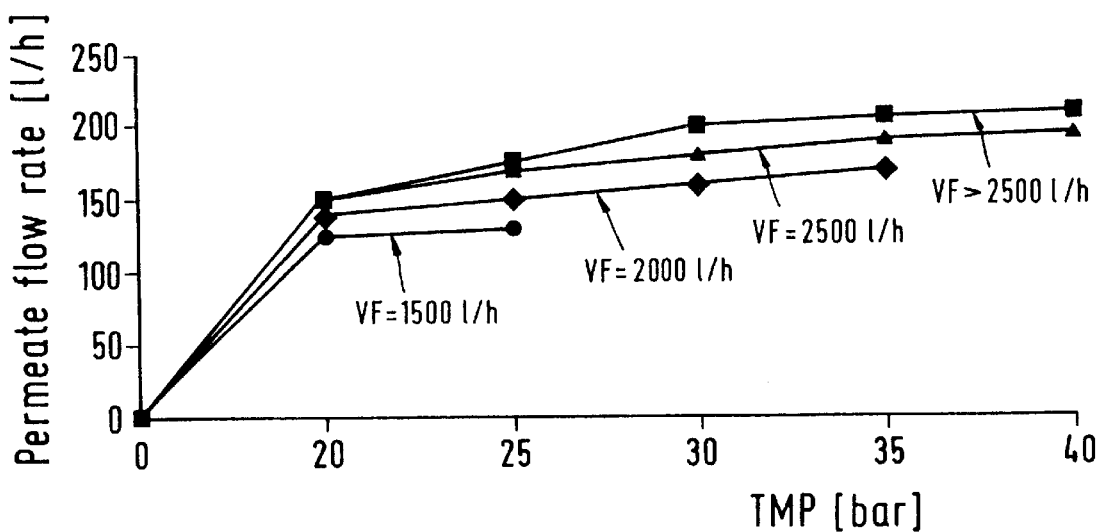
FIG. 1 shows the permeate flow rate of a 20% solution of hydroxypropyl-β-cyclodextrin MS 0.7 in water at a varying transmembrane pressure TMP and a varying retentate flow rate VF.

In the example, the following membrane systems and pressure conditions were used:

Definition $$TMP = ((P_{start} + P_{end})/2) - P_{permeate}$$

TMP=transmembrane pressure, average
$P_{start}$=retentate pressure before the membrane module
$P_{end}$=retentate pressure after the membrane module
$P_{permeate}$=permeate pressure (generally, $P_{perm}$=0)
Vo=washing volume (1 Vo in the case of 100 l of a CD derivative solution to be purified corresponds to 100 l).

A) reverse-osmosis system: Remolino system (stirred cell) by Millipore

| Pressure: 15–40 bar, preferably 35–40 bar | | | | |
|---|---|---|---|---|
| Manufacturer | Membrane | Cut-Off | Material | Diameter |
| Berghof | BM 5 | 500 NMWCO | polyamide | 76 mm |
| Millipore | R 75 A | 400 NMWCO | polyamide | 76 mm |
| Millipore | R 76 A | 400 NMWCO | polyamide | 76 mm |
| Millipore | Nanomax 50 | 350 NMWCO | polyamide | 76 mm |

NMWCO = nominal molecular weight cut-off

B) reverse-osmosis system

| Pressure: 15–40 bar TMP, preferably 35–40 bar TMP | | | | |
|---|---|---|---|---|
| Manufacturer | Membrane | Cut-Off | Material | Filter Surface Area |
| Millipore | R 75A | 400 NMWCO | polyamide | 0.3 m² |

C) Reverse-osmosis system: Millipore tangential-flow filtration system MSP006256 for a maximum of 2 spirally wound reverse-osmosis modules, each with a membrane surface area of approximately 5 m²

| Pressure: 15–40 bar TMP, preferably 35–40 bar TMP | | | | |
|---|---|---|---|---|
| Manufacturer | Membrane | Cut-Off | Material | Filter Surface Area |
| Millipore | R 76 A | 400 NMWCO | polyamide | 5.1 m² |
| Millipore | Nanomax 50 | 350 NMWCO | polyamide | 5.76 m² |

EXAMPLE 1

Removal of Sodium Chloride from Methyl-β-cyclodextrin DS 1.8

System: Millipore tangential-flow filtration system MSP006256, spirally wound reverse-osmosis module R 76 A, membrane surface area 5.1 m².

Protocol: Reverse osmosis with 160 l of a 15% solution of methyl-β-cyclodextrin DS 1.8 in water at 40 bar TMP, pH=7, 31° C., constant retentate volume. The salt content was determined by titration. To determine the CD loss, a specific amount of the filtrate was lyophilized and weighed. The salt content of this residue was determined. The CD loss was calculated as the difference between product weight and salt content.

Table 1 shows the chronological course of the purification and the product loss which occurs.

TABLE 1

| Time [h] | Vo | Salt Content [%] | CD loss [%] |
|---|---|---|---|
| 0 | 0 | 18.4 | 0 |
| 2 | 2 | 1.65 | 0.31 |
| 4 | 4 | 0.23 | 0.58 |
| 6 | 6 | 0.049 | 1.15 |

In this test, the product loss was 0.19% per Vo.

EXAMPLE 2

Removal of Sodium Chloride from Methyl-β-cyclodextrin DS 1.8

System: Remolino system by Millipore, membrane disk by Berghof, diameter 76 mm.

Protocol: Reverse osmosis of 150 ml of a 20% solution of methyl-β-cyclodextrin DS 1.8 in water at 40 bar, pH=7, room temperature. After in each case 50 ml of permeate, the reverse osmosis was interrupted and the retentate volume made up to 150 ml. The salt content was determined by titration.

Table 2 shows the course of the purification.

TABLE 2

| Vo | Salt Content [%] |
|---|---|
| 0 | 15 |
| 1 | 5.6 |
| 2 | 3.0 |
| 3 | 1.53 |
| 4 | 0.82 |

EXAMPLE 3

Removal of Sodium Chloride from Methyl-β-cyclodextrin DS 1.8

System: Millipore tangential flow filtration system MSP006256, spirally wound reverse-osmosis module Nanomax 50, membrane surface area 5.76 m$^2$.

Protocol: Reverse osmosis of 66 l of a 35% solution of methyl-β-cyclodextrin DS 1.8 in water at 40 bar TMP, pH=7, 45°–48° C., constant volume and subsequent concentration. The salt content was determined by titration. To determine the CD loss, a specific amount of the filtrate was lyophilized and weighed. The salt content of this residue was determined. The CD loss was calculated as the difference between product weight and salt content.

Table 3 shows the chronological course of the purification and the concentration of the cyclodextrin derivative solution.

TABLE 3

| Time [h] [min.] | Vo | Salt Content [%] | CD Content of the solution |
|---|---|---|---|
| 0 | 0 | 15.14 | 35 |
| 12 | 0.25 | 10.57 | 35 |
| 23 | 0.5 | 7.39 | 35 |
| 31 | 0.75 | 5.17 | 35 |
| 39 | 1 | 3.56 | 35 |
| 49 | 1.25 | 2.52 | 42.5 |
| 54 | 1.50 | 0.96 | 50 |

EXAMPLE 4

Removal of Sodium Chloride from Methyl-β-cyclodextrin DS 0.6

System: Millipore tangential flow filtration system MSP006256, spirally wound reverse osmosis module R 76 A, membrane surface area 5.1 m$^2$.

Protocol: Reverse osmosis of 200 l of a 16% solution of methyl-β-cyclodextrin DS 0.6 in water at 40 bar TMP, pH=7, 35° C., constant volume. The salt content was determined by titration. To determine the CD loss, a specific amount of the filtrate was lyophilized and weighed. The salt content of this residue was determined. The CD loss was calculated as the difference between product weight and salt content.

Table 4 shows the chronological course of the purification and the product loss which occurs.

TABLE 4

| Time [h] | Vo | Salt Content [%] | CD Loss [%] |
|---|---|---|---|
| 0 | 0 | 16.13 | 0 |
| 4.4 | 3 | 0.13 | 0.75 |
| 7.1 | 5 | 0.033 | 1 |

In this test, the product loss was 0.2% per Vo.

EXAMPLE 5

Removal of Sodium Chloride from Methyl-γ-cyclodextrin DS 0.6

System: Millipore tangential flow filtration system MSP006256, spirally wound reverse osmosis module R 76 A, membrane surface area 5.1 m$^2$.

Protocol: Reverse osmosis of 190 l of a 19% solution of methyl-γ-cyclodextrin DS 0.6 in water at 40 bar TMP, pH=7, 39° C., at constant volume. The salt content was determined by titration. To determine the CD loss, a specific amount of the filtrate was lyophilized and weighed. The salt content of this residue was determined. The CD loss was calculated as the difference between product weight and the salt content.

Table 5 shows the chronological course of the purification and the product loss which occurs.

TABLE 5

| Time [h] | Vo [h] | Salt Content [%] | CD Loss |
|---|---|---|---|
| 0 | 0 | 15.49 | 0 |
| 4.75 | 2 | 0.48 | 0.55 |

TABLE 5-continued

| Time [h] | Vo [h] | Salt Content [%] | CD Loss |
|---|---|---|---|
| 9.5 | 4 | 0.049 | 1.07 |
| 13 | 5.5 | 0.016 | 1.27 |

In this test, the product loss was 0.23% per Vo.

EXAMPLE 6

Removal of Sodium Acetate and the Acetic Acid from Acetyl-β-cyclodextrin DS 1.0

System: Millipore tangential flow filtration system MSP006256, spirally wound reverse osmosis module R 76 A, membrane surface area 5.1 m$^2$.

Protocol: Reverse osmosis of 100 l of a 25% solution of acetyl-β-cyclodextrin DS 1.0 in water at 40 bar TMP, pH=7, 33° C., constant volume. The acetate content was determined enzymatically (Boehringer Mannheim Kit. No. 148 261).

Table 6 shows the course of the purification.

TABLE 6

| Vo | Acetate content [%] |
|---|---|
| 0 | 17.50 |
| 1 | 9.27 |
| 2 | 4.61 |
| 3 | 1.45 |
| 4 | 0.62 |
| 5 | 0.32 |
| 6 | 0.09 |
| 7 | 0.05 |
| 8 | 0.01 |
| 9 | <0.01 |

EXAMPLE 7

Removal of Dimethylformamide from Branched β-cyclodextrin

System: Millipore tangential flow filtration system Pro-Lab, spirally wound reverse-osmosis module R75A, membrane surface area 0.3 m$^2$.

Protocol: Reverse osmosis of 2.7 l of a 20% solution of branched-β-cyclodextrin in water at 40 bar TMP, pH=7, 30° C., constant volume. The dimethylformamide content was determined by analyzing a lyophilized sample by $^1$H NMR.

Table 7 shows the course of the purification.

TABLE 7

| Vo | DMF Content [%] |
|---|---|
| 0 | 2.63 |
| 1 | 0.91 |
| 2.11 | 0.54 |
| 3.19 | 0.18 |
| 4.2 | 0.13 |

COMPARISON EXAMPLE 1

Removal of Sodium Chloride from Carboxymethyl-β-cyclodextrin DS 0.6

System: Ultrafiltration system Pellicon by Millipore, plate module SK1P714AO, membrane surface area 0.465 m$^2$, NMWCO 1000 D.

Protocol: Ultrafiltration of 2000 l of a 10% solution of carboxymethyl-β-cyclodextrin DS 0.6 in water at 2 bar TMP, pH=7, 25° C., constant volume. In this test, the starting material was prepurified carboxymethyl-β-CD DS 0.6 without glycolic acid, which had been treated with sodium chloride. The salt content was determined by titration. To determine the CD loss, a specific amount of the filtrate was lyophilized and weighed. The salt content of this residue was determined. The CD loss was calculated as the difference between product weight and salt content.

Table 8 shows the course of the purification.

TABLE 8

| Vo | Salt Content [%] | CD Loss [%] |
|---|---|---|
| 0 | 13.72 | 0 |
| 0.6 | 9.43 | 13.15 |
| 1.2 | 6.13 | 24.78 |
| 1.8 | 1.73 | 33.72 |

In this test, the product loss was 18.7% per Vo.

EXAMPLE 8

Removal of Sodium Chloride and Glycolic Acid from Carboxymethyl-β-cyclodextrin DS 0.6

System: Remolino system by Millipore, membrane disk R 76 A, diameter 76 mm.

Protocol: Reverse osmosis of 150 ml of a 20% solution of carboxy-methyl-β-cyclodextrin DS 0.6 in water at 40 bar, pH=7, room temperature. After in each case 60 ml of permeate, the reverse osmosis was interrupted and the retentate volume made up to 150 ml. The salt content was determined by titration. The glycolic acid content in the CD derivative was calculated. The decrease in glycolic acid content was determined by $^1$H NMR.

Table 9 shows the course of the purification.

TABLE 9

| Vo | Glycolic acid [%] | Salt Content [%] |
|---|---|---|
| 0 | 3.99 | 15.3 |
| 0.4 | 2.88 | 8.44 |
| 0.8 | 2.28 | 4.36 |
| 1.2 | 1.63 | 1.78 |
| 1.6 | 1.15 | 1.01 |
| 2 | 0.69 | 0.57 |
| 2.4 | 0.49 | 0.56 |

EXAMPLE 9

Removal of Sodium Chloride and Glycolic Acid from Carboxymethyl-β-cyclodextrin DS 0.6

System: Millipore tangential flow filtration system MSP006256, spirally wound reverse-osmosis module Nanomax 50, membrane surface area 5.76 m$^2$.

Protocol: Reverse osmosis of 100 l of a 25% solution of carboxymethyl-β-cyclodextrin DS 0.6 in water at 40 bar TMP, pH=7, 34° C., constant volume. The salt content was determined by titration. The glycolic acid content in the CD derivative was calculated. The decrease in glycolic acid content was determined by $^1$H NMR.

Table 10 shows the course of the purification.

TABLE 10

| Vo | Glycolic Acid [%] | Salt Content [%] |
|---|---|---|
| 0 | 2.69 | 14.80 |
| 1 | 1.11 | 2.61 |
| 2 | 0.19 | 0.13 |
| 3 | 0.03 | 0.01 |

EXAMPLE 10

Removal of Sodium Chloride and Hydroxypropyl-3-trimethylammonium Chloride from Gycidyl-trimethylammonium-β-cyclodextrin MS 0.5

System: Remolino system by Millipore, membrane disk Nanomax 50, diameter 76 mm.

Protocol: Reverse osmosis of 150 ml of a 25% solution of glycidyl-methylammonium-β-cyclodextrin DS 0.5 in water at 40 bar, pH=7, room temperature. After in each case 60 ml of permeate, the reverse osmosis was interrupted and the retentate volume made up to 150 ml. The 1,2-dihydroxy-propyl-3-trimethylammonium chloride (diol) content in the CD derivative was calculated. The decreasing 1,2-dihydroxypropyl-3-trimethylammonium chloride content was determined by $^1$H NMR.

Table 11 shows the course of the purification.

TABLE 11

| Vo | Diol [%] |
|---|---|
| 0 | 8.26 |
| 0.4 | 6.00 |
| 0.8 | 6.00 |
| 1.2 | 5.66 |
| 2 | 4.15 |
| 2.8 | 3.78 |
| 3.6 | 3.12 |
| 5.2 | 3.12 |
| 6.8 | 2.83 |
| 8 | 2.17 |

EXAMPLE 11

Removal of Sodium Chloride as Well as Mono- and Diglycol from Hydroxypropyl-β-cyclodextrin MS 0.9

System: Millipore tangential flow filtration system MSP006256, spirally wound reverse-osmosis module R 76 A, membrane surface area 5.1 m$^2$.

Protocol Reverse osmosis of 190 l of a 30% solution of hydroxypropyl-β-cyclodextrin MS 0.9 in water at 40 bar TMP, pH=7, 33° C., constant volume. The salt content was determined by titration. To determine the CD loss, a specific amount of the filtrate was lyophilized and weighed. The salt and glycol content of this residue were determined. The CD loss was calculated as the difference between product weight and salt and glycol content. The glycol content was determined by gas chromatography following extraction of a lyophilized sample with acetone.

Table 12 shows the course of the purification and the product loss which occurs.

TABLE 12

| Vo | Monoglycol [%] | Diglycol [%] | Salt Content [%] | CD Loss |
|---|---|---|---|---|
| 0 | 3.84 | 0.27 | 3.44 | 0 |
| 1 | 0.831 | 0.115 | 0.33 | 0.84 |
| 3 | 0.068 | 0.03 | 0.021 | 0.998 |
| 4 | 0 | 0 | 0.01 | 1.13 |

In this test, the product loss was 0.28% per Vo.

EXAMPLE 12

Permeate Flow Rate of a 20% Hydroxypropyl-β-cyclodextrin Solution MS 0.7 at Varying Transmembrane Pressure TMP and Varying Retentate Flow Rate VF System: Millipore tangential flow filtration system MSP006256, with spirally wound reverse-osmosis module R 76 A, membrane surface area 5.1 m$^2$.

Protocol: Reverse osmosis of 90 kg of a 20% solution of hydroxypropyl-β-cyclodextrin MS 0.7 in water at varying TMP, pH=7, 40° C., constant volume. The filtrate was not removed, the solution was circulated with a varying retentate flow rate VF.

FIG. 1 shows the permeate flow rate of a 20% solution of hydroxypropyl-β-cyclodextrin MS 0.7 in water at a varying transmembrane pressure TMP and a varying retentate flow rate VF.

EXAMPLE 13

Permeate Flow Rate of an Aqueous Hydroxypropyl-β-cyclodextrin Solution MS 0.7 at a Varying Concentration and a Varying Transmembrane Pressure TMP System Millipore tangential flow filtration system MSP006256, spirally wound reverse-osmosis module R 76 A, membrane surface area 5.1 m$^2$.

Protocol: Reverse osmosis of 90 kg of a solution of hydroxypropyl-β-cyclodextrin MS 0.7 in water at varying concentration, 20–40 bar TMP, pH=7, 40° C., constant volume. The filtrate was not removed, the solution was circulated.

Figure 2:
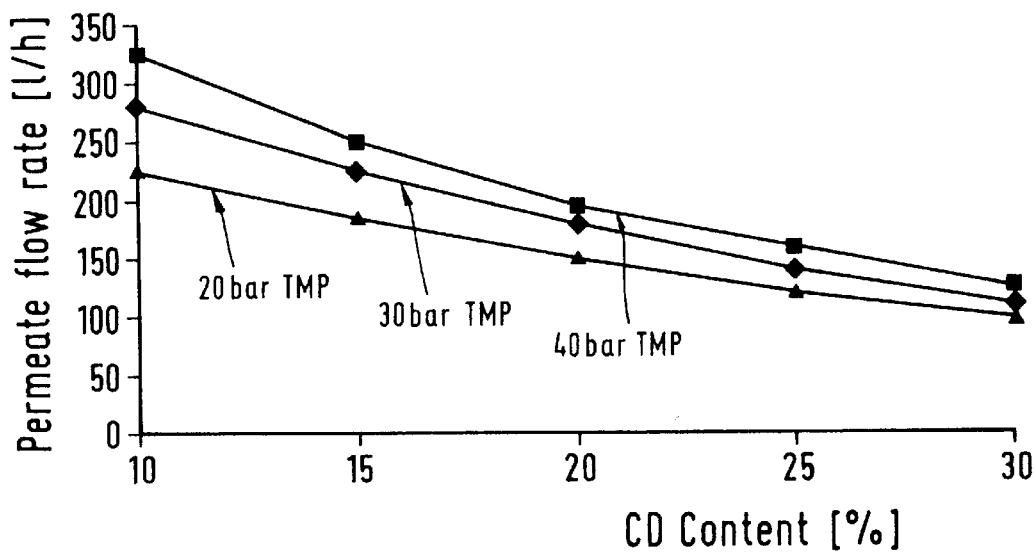
FIG. 2 shows the permeate flow rate of a solution of hydroxypropyl-β-cyclodextrin MS 0.7 in water at a varying concentration and a varying transmembrane pressure TMP.

FIG. 2 shows the permeate flow rate of a solution of hydroxypropyl-β-cyclodextrin MS 0.7 in water at a varying concentration and a varying transmembrane pressure TMP.

While several embodiments of the present invention have been shown and described, it is to be understood that many changes and modifications may be made thereunto without departing from the spirit and scope of the invention as defined in the appended claims.

What is claimed is:

1. A process for the purification of water-soluble cyclodextrin derivatives, comprising reverse osmosis (RO) using at least one hydrophilic, asymmetric solution-diffusion membrane with a nominal molecular weight cut-off of 350–500 D in order to remove from an aqueous solution of a water-soluble cyclodextrin derivative an impurity selected from the group consisting of sodium chloride, sodium acetate and acetic acid, dimethyl formamide, sodium chloride and glycolic acid, sodium chloride and dihydroxy propyl trimethyl ammonium chloride, and sodium chloride and monoglycol and diglycol; and wherein the purification process has a product loss of less than 0.3% per Vo.

2. The process as claimed in claim 1, wherein the cyclodextrin derivative to be purified is employed as a 5–60% by weight solution.

3. The process as claimed in claim 1, wherein the transmembrane pressure in the process is 15–70 bar and the temperature is 20°–80° C.

4. The process as claimed in claim 1, wherein the pH range of the process is between pH 2 and pH 11.

5. The process as claimed in claim 1, wherein spirally wound membrane modules are used.

6. A process for the purification of water-soluble cyclodextrin derivatives, comprising reverse osmosis (RO) using at least one hydrophilic, asymmetric solution-diffusion membrane with a nominal molecular weight cut-off of 350–500 D in order to remove from an aqueous solution of a water-soluble cyclodextrin derivative an impurity selected from the group consisting of NaCl, KCl, $Na_2CO_3$, glycolic acid, monopropylene glycol, dipropylene glycol, acetic acid, sodium acetate, 1,2-di-hydroxypropyl-3-trimethylammonium chloride, 2-chloro-4,6,-dihydroxy-1,3,5-triazine (monosodium salt), DMF, DMSO, dioxane, THF, methyl ethyl ketone, acetone, methanol, ethanol, isopropanol, butanol, glycerol and ethylene glycol; and wherein the purification process has a product loss of less than 0.3% per Vo.

7. The process as claimed in claim 6, wherein the cyclodextrin derivative to be purified is employed as a 5–60% by weight solution.

8. The process as claimed in claim 6, wherein the transmembrane pressure in the process is 15–70 bar and the temperature is 20°–80° C.

9. The process as claimed in claim 6, wherein the pH range of the process is between pH 2 and pH 11.

10. The process as claimed in claim 6, wherein spirally wound membrane modules are used.

11. The process as claimed in claim 1, wherein the transmembrane pressure is 30 to 40 bar, the temperature is 20° C. to 50° C., and the pH range is 6 to 8.

12. The process as claimed in claim 6, wherein the transmembrane pressure is 30 to 40 bar, the temperature is 20° C. to 50° C., and the pH range is 6 to 8.

13. The process as claimed in claim 1, wherein the amount of impurity remaining after purification is below 0.1% (g/g).

14. The process as claimed in claim 6, wherein the amount of impurity remaining after purification is below 0.1% (g/g).

* * * * *